(12) United States Patent
Shiau et al.

(10) Patent No.: US 12,736,734 B2
(45) Date of Patent: Sep. 15, 2026

(54) SURFACE LIGHT SOURCE MODULE AND DUAL-SIDED TRANSPARENT DISPLAY DEVICE

(71) Applicant: Coretronic Corporation, Hsin-Chu (TW)

(72) Inventors: Tzeng-Ke Shiau, Hsin-Chu (TW); Ying-Shun Syu, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 65 days.

(21) Appl. No.: 19/034,577

(22) Filed: Jan. 23, 2025

(65) Prior Publication Data

US 2025/0244519 A1 Jul. 31, 2025

(30) Foreign Application Priority Data

Jan. 26, 2024 (CN) ......................... 202420191323.2

(51) Int. Cl.
*F21V 8/00* (2006.01)

(52) U.S. Cl.
CPC ......... *G02B 6/0035* (2013.01); *G02B 6/0063* (2013.01); *G02B 6/0075* (2013.01)

(58) Field of Classification Search
CPC .. G02B 6/0035; G02B 6/0036; G02B 6/0063; G02B 6/0075
See application file for complete search history.

(56) References Cited

U.S. PATENT DOCUMENTS 8,764,269 B2 7/2014 Matsumoto et al.
9,329,328 B2 * 5/2016 Chen .................... G02B 6/0051
11,460,730 B2 * 10/2022 Chen .................... G02B 6/0025
12,601,870 B2 * 4/2026 Lee ...................... G02B 6/0063
2016/0238777 A1 * 8/2016 Chen .................... G02B 6/0016
2017/0153379 A1 6/2017 Chang et al.

FOREIGN PATENT DOCUMENTS

TW 202144821 A 12/2021
TW M648077 U 11/2023

OTHER PUBLICATIONS

The extended European search report, dated May 20, 2025, in European patent Application No. 25151450.1.

* cited by examiner

*Primary Examiner* — Matthew J. Peerce

(57) ABSTRACT

A surface light source module includes a light guide plate, a light source component, a covering layer, and an optical adhesive layer. The light guide plate has a first surface, a second surface, and a light incident surface. The first surface has multiple microstructures. The optical adhesive layer is disposed between the light guide plate and the covering layer. Each microstructure has a symmetry plane and a first structural surface. The interface between the first structural surface and the symmetry plane has a first intersection line. The first intersection line includes a first-part line segment, a second-part line segment, and a third-part line segment. A third included angle between the third-part line segment and the first surface is 50-90 degrees. A third length of the third-part line segment is greater than or equal to 5% of the total length of the first intersection line.

15 Claims, 4 Drawing Sheets

SURFACE LIGHT SOURCE MODULE AND DUAL-SIDED TRANSPARENT DISPLAY DEVICE

CROSS-REFERENCE TO RELATED APPLICATION

This application claims the priority benefit of China application serial no. 202420191323.2, filed on Jan. 26, 2024. The entirety of the above-mentioned patent application is hereby incorporated by reference herein and made a part of this specification.

TECHNICAL FIELD

The disclosure relates to a light source module, and more particularly to a surface light source module and a dual-sided transparent display device.

BACKGROUND

A reflective display device can allow a user to see a display image by reflecting ambient light. However, in a situation where ambient light is insufficient, a front light module is usually required to provide a light source. The conventional front light module usually uses a light guide plate to emit light beams uniformly, such as disposing a plurality of microstructures on the surface of the light guide plate to achieve uniform light. To avoid affecting the optical effect of the microstructures, the conventional front light module usually retains an air gap between the light guide plate and a glass plate or a touch panel. However, this configuration may cause reflection at the interface between the front light module and the air gap under strong ambient light, thereby reducing the visibility of the reflective display device.

The information disclosed in this "BACKGROUND" section is only for enhancement understanding of the background and therefore it may contain information that does not form the prior art that is already known to a person of ordinary skill in the art. Furthermore, the information disclosed in this "BACKGROUND" section does not mean that one or more problems to be solved by one or more embodiments of the disclosure were acknowledged by a person of ordinary skill in the art.

SUMMARY

The disclosure provides a surface light source module in which a light guide plate is provided with a plurality of microstructures.

Other advantages and objectives of the disclosure may be further illustrated by the technical features broadly embodied and described as follows.

To achieve one or a portion of or all of the objectives or other objectives, a surface light source module in an embodiment of the disclosure includes a light guide plate, a light source component, a covering layer, and an optical adhesive layer. The light guide plate has a first surface, a second surface, and a light incident surface, where the first surface and the second surface are opposite to each other, and the light incident surface connects the first surface and the second surface. The first surface is provided with a plurality of microstructures. The light source component is disposed opposite to the light incident surface. The covering layer is disposed opposite to the first surface. The optical adhesive layer is disposed between the light guide plate and the covering layer and covers the microstructures. Each microstructure has a first structural surface connected to the first surface. Each microstructure has a symmetry plane. The symmetry plane is perpendicular to the first surface, and an included angle between the symmetry plane and the light incident surface is from 45 degrees to 90 degrees. There is a first intersection line in an intersection between the first structural surface and the symmetry plane, and the first intersection line includes a first-part line segment, a second-part line segment, and a third-part line segment. The first-part line segment or the third-part line segment is connected to the first surface, and the second-part line segment is connected between the first-part line segment and the third-part line segment. The optical adhesive layer at least contacts the second-part line segment of the first intersection line of the first structural surface. There is a first included angle between a tangent line at each position on the first-part line segment and the first surface, and there is a third included angle between a tangent line at each position on the third-part line segment and the first surface. The first included angle is greater than 0 degrees and less than or equal to 30 degrees, the third included angle is greater than or equal to 50 degrees and less than or equal to 90 degrees, and the second-part line segment is a curve. A ratio of a first length of the first-part line segment to the total length of the first intersection line is greater than or equal to 5%, and a ratio of a third length of the third-part line segment to the total length of the first intersection line is greater than or equal to 5%.

A surface light source module in an embodiment of the disclosure includes a light guide plate, a light source component, a covering layer, and an optical adhesive layer. The light guide plate has a first surface, a second surface, and a light incident surface, where the first surface and the second surface are opposite to each other, and the light incident surface connects the first surface and the second surface. The first surface is provided with a plurality of microstructures. The light source component is disposed opposite to the light incident surface. The covering layer is disposed opposite to the first surface. The optical adhesive layer is disposed between the light guide plate and the covering layer and covers the microstructures. Each microstructure has a first structural surface connected to the first surface. Each microstructure has a symmetry plane. The symmetry plane is perpendicular to the first surface, and an included angle between the symmetry plane and the light incident surface is from 45 degrees to 90 degrees. There is a first intersection line in an intersection between the first structural surface and the symmetry plane, and the first intersection line includes a first-part line segment, a second-part line segment, and a third-part line segment. The first-part line segment or the third-part line segment is connected to the first surface, and the second-part line segment is connected between the first-part line segment and the third-part line segment. The optical adhesive layer at least contacts the second-part line segment of the first intersection line of the first structural surface. There is a first included angle between a tangent line at each position on the first-part line segment and the first surface, there is a second included angle between a tangent line at each position on the second-part line segment and the first surface, and there is a third included angle between a tangent line at each position on the third-part line segment and the first surface. The first included angle has a maximum value of the first included angle, the third included angle has a minimum value of the third included angle, the maximum value of the first included angle is greater than 0 degrees and less than or equal to 40 degrees, and the minimum value of the third included angle is greater than or equal to 50 degrees and less than or equal to 90 degrees. A ratio of a first length of the first-part line segment to a total length of the first intersection line is greater than or equal to 5%, and a ratio of a third length of the third-part line segment to the total length of the first intersection line is greater than or equal to 5%. The second included angle is gradually increased from the maximum value of the first included angle to the minimum value of the third included angle.

A dual-sided transparent display device in an embodiment of the disclosure includes a transparent display panel and two aforementioned surface light source modules, and the transparent display panel is disposed between the two surface light source modules.

Other objectives, features and advantages of the disclosure will be further understood from the further technological features disclosed by the embodiments of the disclosure wherein there are shown and described preferred embodiments of this disclosure, simply by way of illustration of modes best suited to carry out the disclosure.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION OF PREFERRED EMBODIMENTS

In the following detailed description of the preferred embodiments, reference is made to the accompanying drawings which form a part hereof, and in which is shown by way of illustration specific embodiments in which the disclosure may be practiced. In this regard, directional terminology, such as "top", "bottom", "front", "back", etc., is used with reference to the orientation of the Figure(s) being described. The components of the disclosure can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the disclosure. Also, it is to be understood that the phraseology and terminology used herein are for the purpose of description and should not be regarded as limiting. The use of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings. Similarly, the terms "facing", "faces", and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 1:
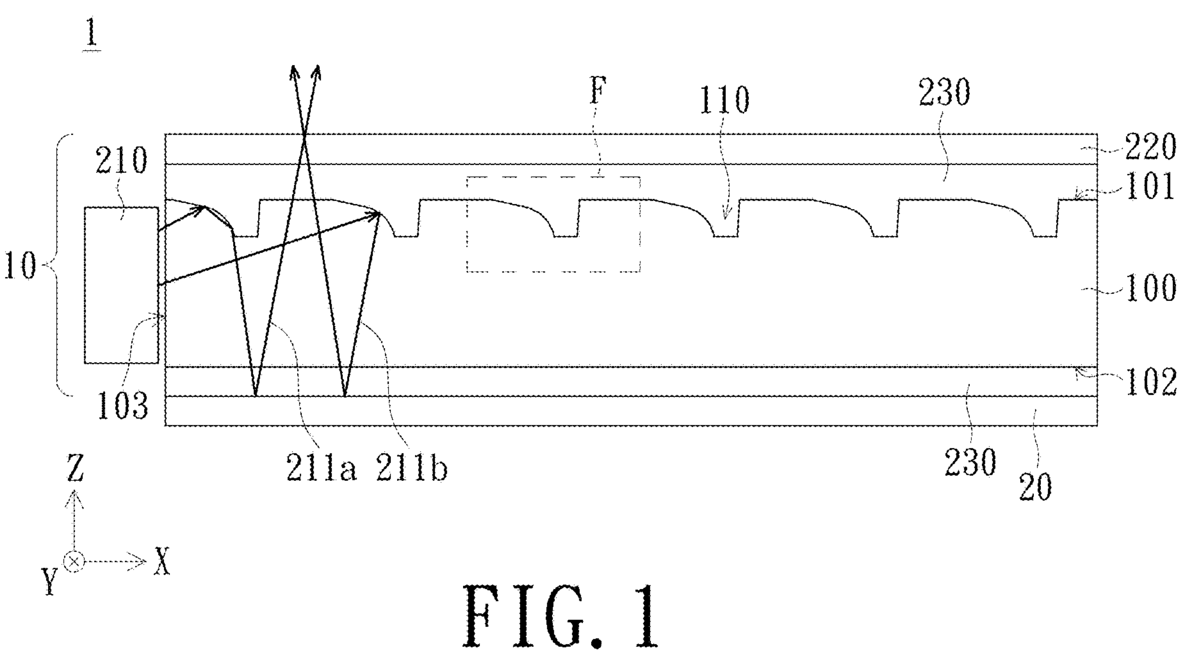
FIG. 1 is a schematic cross-sectional diagram of a display device according to an embodiment of the disclosure.
Figure 2:
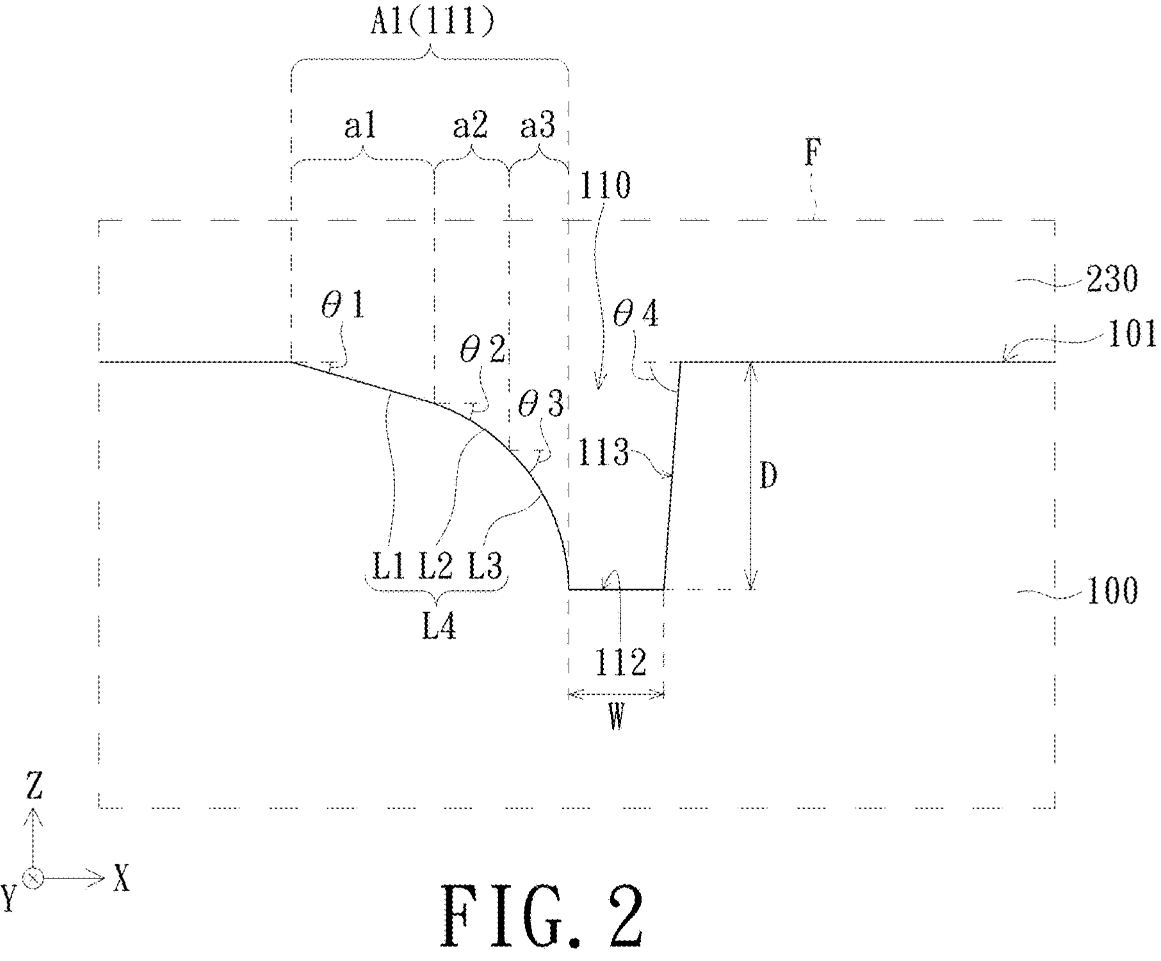
FIG. 2 is a schematic enlarged diagram of a block in FIG. 1.

FIG. 1 is a schematic cross-sectional diagram of a display device according to an embodiment of the disclosure. FIG. 2 is a schematic enlarged diagram of a block F in FIG. 1. Refer to FIG. 1 and FIG. 2. A display device 1 in an embodiment of the disclosure includes a surface light source module 10 and a display element 20. The surface light source module 10 includes a light guide plate 100, a light source component 210, a covering layer 220, and an optical adhesive layer 230. The light guide plate 100 has a first surface 101, a second surface 102, and a light incident surface 103, where the first surface 101 and the second surface 102 are opposite to each other, and the light incident surface 103 is connected to the first surface 101 and the second surface 102. The first surface 101 is provided with a plurality of microstructures 110. The light source component 210 is disposed opposite to the light incident surface 103. The covering layer 220 is disposed opposite to the first surface 101. The optical adhesive layer 230 is disposed between the light guide plate 100 and the covering layer 220. The light source component 210 in this embodiment includes, for example, a plurality of light-emitting elements, and the light-emitting elements are, for example, light-emitting diodes, but the disclosure is not limited thereto. The display element 20 is, for example, a reflective liquid crystal panel.

Figure 3:
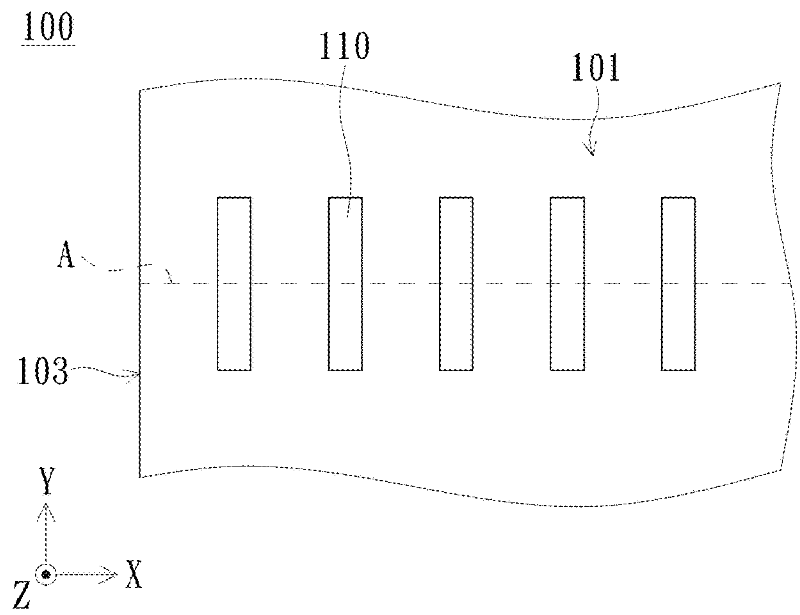
FIG. 3 is a schematic top view of a light guide plate according to an embodiment of the disclosure.

FIG. 3 is a schematic top view of a light guide plate according to an embodiment of the disclosure. Refer to FIG. 2 and FIG. 3. In this embodiment, each microstructure 110 has, for example, a first structural surface 111 connecting the first surface 101, and each microstructure 110 has a symmetry plane A. The intersection between the first structural surface 111 and the symmetry plane A has a first intersection line A1, and the first intersection line A1 includes a first-part line segment a1, a second-part line segment a2, and a third-part line segment a3. The first-part line segment a1 is connected to the first surface 101, and the second-part line segment a2 is connected between the first-part line segment a1 and the third-part line segment a3. Specifically, the microstructure 110 in this embodiment is, for example, a concave microstructure recessed from the first surface 101, and the outline of the microstructure 110 in a top view (that is, the projection of the microstructure 110 on the first surface 101) is, for example, elongated. As shown in FIG. 3, the symmetry plane A passes through, for example, the geometric center of the microstructure 110, and the microstructure 110 is symmetrical (for example, mirror-symmetrical) relative to the symmetry plane A. The symmetry plane A is, for example, perpendicular to the first surface 101, and the included angle between the symmetry plane A and the light incident surface 103 is from 45 degrees to 90 degrees. For example, the included angle between the symmetry plane A and the light incident surface 103 in this embodiment is 90 degrees, but the disclosure does not specifically limit this. The disclosure also does not specifically limit the shape of the microstructure 110. In another embodiment, the outer contour of the projection of the microstructure 110 on the first surface 101 may be a fan-like shape, an arc-like shape, or the like.

Still refer to FIG. 1 and FIG. 2. In this embodiment, the first-part line segment a1 is adjacent to the light incident surface 103. There is a first included angle θ1 between the tangent line at each position on the first-part line segment a1 and the first surface 101. There is a second included angle θ2 between the tangent line at each position on the second-part line segment a2 and the first surface 101. There is a third included angle θ3 between the tangent line at each position on the third-part line segment a3 and the first surface 101. The first included angle θ1 is, for example, greater than 0 degrees and less than or equal to 30 degrees. The third included angle θ3 is, for example, greater than or equal to 50 degrees and less than or equal to 90 degrees. The second included angle θ2 is, for example, gradually increased from 30 degrees to 50 degrees (greater than 30 degrees and less than 50 degrees), but the disclosure does not specifically limit this. Specifically, the first included angle θ1 is an acute angle, wherein as the first included angle θ1 is farther away from the light incident surface 103, the angle of the first included angle θ1 is increasingly greater (the line segment is a curve, for example) or keeps unchanged (the line segment is a straight line, for example). The second included angle θ2 is an acute angle, wherein as the second included angle θ2 is farther away from the light incident surface 103, the angle of the second included angle θ2 is increasingly greater. The third included angle θ3 is an acute angle, wherein as the third included angle θ3 is farther away from the light incident surface 103, the angle of the third included angle θ3 is increasingly greater or remains unchanged. In other words, as the first intersection line A1 is farther away from the light incident surface 103, the included angle between the first intersection line A1 and the first surface 101 is increasingly greater or remains unchanged. The maximum value of the first included angle θ1 is less than or equal to the minimum value of the second included angle θ2. The maximum value of the second included angle θ2 is less than or equal to the minimum value of the third included angle θ3. In addition, in one embodiment, the first-part line segment a1 is, for example, a curve, a straight line, or a combination of a curve and a straight line, the second-part line segment a2 is, for example, a curve, and the third-part line segment a3 is, for example, a curve, a straight line, or a combination of a curve and a straight line. Specifically, the first-part line segment a1, the second-part line segment a2, and the third-part line segment a3 in this embodiment are, for example, all curves, but the disclosure does not specifically limit this. In this embodiment, the difference value between the third included angle θ3 and the first included angle θ1 (for example, the difference value between the maximum value of the third included angle θ3 of the third-part line segment a3 and the minimum value of the first included angle θ1 of the first-part line segment a1) is, for example, greater than or equal to 30 degrees, greater than or equal to 50 degrees, or greater than or equal to 70 degrees, and may be 40 degrees or 50 degrees, but the disclosure does not specifically limit this.

Continued from the above, in this embodiment, the ratio of the first length L1 of the first-part line segment a1 to the total length L4 of the first intersection line A1 is greater than or equal to 5%, the ratio of the second length L2 of the second-part line segment a2 to the total length L4 of the first intersection line A1 is less than or equal to 90%, and the ratio of the third length L3 of the third-part line segment a3 to the total length L4 of the first intersection line A1 is greater than or equal to 5%. Specifically, the total length L4 of the first intersection line A1 is, for example, the sum of the first length L1, the second length L2, and the third length L3. In another embodiment, the first-part line segment a1 is, for example, a combination of a straight line (the first included angle θ1 is, for example, 15 degrees) and a curve (the first included angle θ1 is, for example, 15 degrees and is gradually increased to 30 degrees). The third-part line segment a3 is, for example, a combination of a curve (the third included angle θ3 is, for example, 50 degrees and is gradually increased to 75 degrees) and a straight line (the third included angle θ3 is, for example, 75 degrees). In still another embodiment, the first-part line segment a1 is, for example, a curve (the first included angle θ1 is, for example, 5 degrees and is gradually increased to 30 degrees), and the third-part line segment a3 is, for example, a curve (the third included angle θ3 is, for example, 50 degrees and is gradually increased to 80 degrees). In another embodiment, the ratio of the third-part line segment a3 to the total length L4 of the first intersection line A1 is greater than or equal to 20%, and the ratio of the line segment with the third included angle θ3 greater than 65 degrees to the total length L4 of the first intersection line A1 is greater than or equal to 15%.

From another point of view, in the disclosure, the first included angle θ1 of the first-part line segment a1 has, for example, the maximum value of the first included angle, the third included angle θ3 of the third-part line segment a3 has, for example, the minimum value of the third included angle, the maximum value of the first included angle is, for example, greater than 0 degrees and less than or equal to 40 degrees, and the minimum value of the third included angle is, for example, greater than or equal to 50 degrees and less than or equal to 90 degrees. The ratio of the first length L1 of the first-part line segment a1 to the total length L4 of the first intersection line A1 is greater than or equal to 5%, the ratio of the third length L3 of the third-part line segment a3 to the total length L4 of the first intersection line A1 is greater than or equal to 5%, and the second included angle θ2 is gradually increased from the maximum value of the first included angle to the minimum value of the third included angle. In another embodiment, the maximum value of the first included angle is, for example, 40 degrees, and the minimum value of the third included angle is, for example, 65 degrees. The ratio of the first length L1 of the first-part line segment a1 to the total length L4 of the first intersection line A1 is greater than or equal to 15%, and the ratio of the third length L3 of the third-part line segment a3 to the total length L4 of the first intersection line A1 is greater than or equal to 15%. In still another embodiment, the first included angle θ1 of the first-part line segment a1 has, for example, an average value of the first included angle, the average value of the first included angle is, for example, greater than 0 degrees and less than or equal to 40 degrees, and the ratio of the first length L1 of the first-part line segment a1 to the total length L4 of the first intersection line A1 is greater than or equal to 5%. It should be specially noted that the remaining details are similar to those in the embodiments of the above display device, and no redundant detail is to be given herein.

Refer to FIG. 1 and FIG. 2. When the light provided by the light source component 210 is transmitted to the first structural surface 111, some of the light can be partially or totally reflected on the first structural surface 111 once or several times, thereby correcting the transmission direction of the light to improve the forward light output effect of the surface light source module 10. For example, the light 211*a* is transmitted to the second-part line segment a2 of the first structural surface 111, reflected, and then sequentially transmitted to the third-part line segment a3 and the second surface 102, so that the light 211*a* is emitted from the light guide plate 100 in an approximately forward direction. The light 211*b* is, for example, transmitted to the second-part line segment a2 of the first structural surface 111, reflected, and then transmitted to the second surface 102, so that the light 211*b* is also emitted from the light guide plate 100 in an approximately forward direction.

The optical adhesive layer 230 in this embodiment covers a plurality of microstructures 110. The light guide plate 100 has a first refractive index, and the optical adhesive layer 230 has a second refractive index, where the second refractive index is less than the first refractive index. Specifically, the difference value between the first refractive index and the second refractive index is, for example, 0.1 to 0.15. The first refractive index is, for example, 1.5 to 1.6, such as 1.57, and the second refractive index is, for example, 1.4 to 1.5, such as 1.42 or 1.47, but the disclosure is not specifically limited thereto. When the surface light source module 10 is used in the display device 1 (for example, a reflective display device) and the display device 1 is in a place with strong ambient light, the optical adhesive layer 230 covers and fills the microstructures 110, so that the difference value between the second refractive index and the first refractive index of the optical adhesive layer 230 is far less than the difference value between air and the first refractive index. Therefore, the reflection of the ambient light at the interface between the light guide plate 100 and the optical adhesive layer 230 can be reduced, thereby improving the visibility of the display device 1. In addition, the first structural surface 111 is provided with the first-part line segment a1, the second-part line segment a2, and the third-part line segment a3, thus, even if the difference value between the refractive index of the light guide plate 100 and the refractive index of the optical adhesive layer 230 is small, the light can still be totally reflected in the approximately forward direction.

Based on the above, the optical adhesive layer 230 in this embodiment at least contacts the second-part line segment a2 of the first intersection line A1 of the first structural surface 111. The optical adhesive layer 230 in this embodiment is, for example, fully filled (or fully bonded) between the light guide plate 100 and the covering layer 220, that is, the optical adhesive layer 230 further contacts the first-part line segment a1 and the third-part line segment a3 of the first intersection line A1. The optical adhesive layer 230 is fully filled, so that the covering layer 220 is more firmly bonded to the light guide plate 100, making the structure stronger and reducing stray light. Further, when the covering layer 220 is, for example, a touch panel, the touch experience can be improved.

Still refer to FIG. 2. In this embodiment, each microstructure 110 further has, for example, a second structural surface 112 and a third structural surface 113. The second structural surface 112 is, for example, connected between the first structural surface 111 and the third structural surface 113, the third structural surface 113 is, for example, connected to the first surface 101, and the third-part line segment a3 is, for example, connected to the second structural surface 112. For example, there is an intersection line between the microstructure 110 and the symmetry plane A. The position at which the included angle between the tangent line of the intersection line and the first surface 101 is greater than 50 degrees and then less than 50 degrees can be defined as the junction between the third-part line segment a3 and the second structural surface 112. There is, for example, a fourth included angle θ4 between the third structural surface 113 and the first surface 101, and the fourth included angle θ4 is, for example, greater than or equal to 50 degrees and less than or equal to 90 degrees. Specifically, the third structural surface 113 in this embodiment is, for example, a plane (that is, the intersection line between the third structural surface 113 and the symmetry plane A is, for example, a straight line), and the fourth included angle θ4 is preferably approximate to 90 degrees.

Continuing from the above, the included angle between the second structural surface 112 and the first surface 101 in this embodiment is, for example, greater than or equal to 0 degrees and less than or equal to 30 degrees. The second structural surface 112 has, for example, a width W along the direction X perpendicular to the light incident surface 103. Each microstructure 110 has, for example, a maximum depth D in the direction Z perpendicular to the first surface 101. The width W is, for example, greater than or equal to one-tenth of the maximum depth D, and for example, less than or equal to half of the maximum depth D. For example, the width W is 2 μm, but the disclosure does not specifically limit this. In addition, in this embodiment, the second structural surface 112 is, for example, a plane, but the disclosure is not limited thereto. In another embodiment, the second structural surface 112 may be an arc plane.

The display device 1 in this embodiment is, for example, a reflective display device, the covering layer 220 is, for example, glass or a touch panel, and the surface light source module 10 is, for example, a front light module. The display element 20 is, for example, disposed opposite to the second surface 102, and the optical adhesive layer 230 is, for example, further disposed between the light guide plate 100 and the display element 20. In addition, the surface light source module 10 in this embodiment may further include an optical film (not shown) disposed between the optical adhesive layer 230 and the covering layer 220. The optical film is, for example, a polarizing film, a brightness-enhancing film, or a combination thereof, which can reduce stray light and improve a contrast ratio and a viewing angle.

Because the surface light source module 10 in this embodiment is provided with the microstructure 110 having the first structural surface 111, the surface light source module 10 can provide light beams that are emitted evenly in a forward direction and transmitted toward the display element 20. In addition, the surface light source module 10 in this embodiment uses the optical adhesive layer 230 with a second refractive index to cover the plurality of microstructures 110, which helps to improve the visibility of the display device 1 under strong ambient light.

Figure 4:
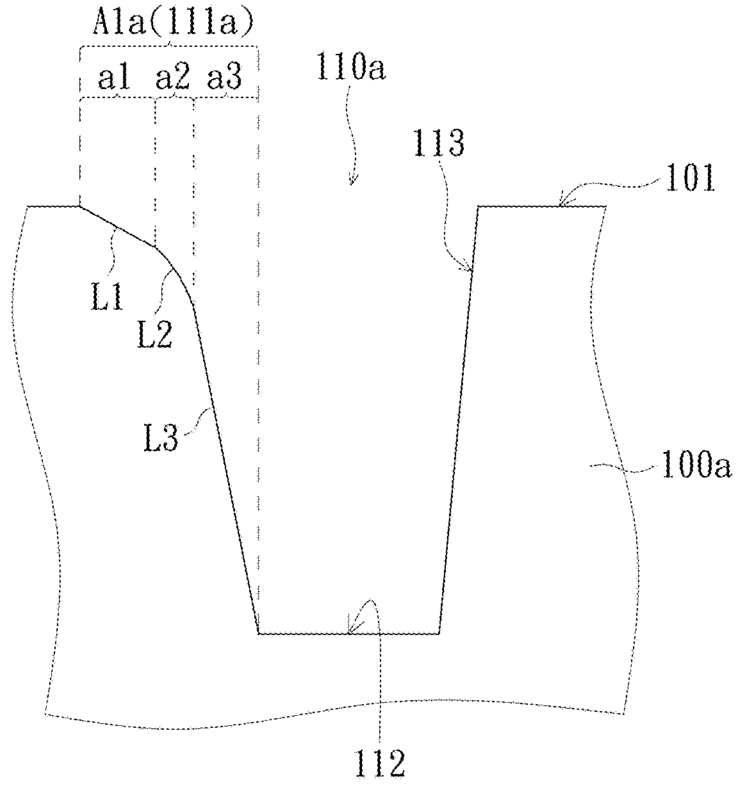
FIG. 4 is a schematic cross-sectional diagram of a single microstructure in a light guide plate according to another embodiment of the disclosure.

FIG. 4 is a schematic cross-sectional diagram of a single microstructure in a light guide plate according to another embodiment of the disclosure. Refer to FIG. 2 and FIG. 4. FIG. 4 is similar to FIG. 2, and the main difference is that the microstructure 110*a* of the light guide plate 100*a* is different from the microstructure 110 of the light guide plate 100. In detail, the ratio of the first length L1 of the first-part line segment a1 to the first intersection line A1*a* is, for example, less than that to the first intersection line A1, for example, greater than 0% and less than 5%, and the ratio of the third length L3 of the third-part line segment a3 to the first intersection line A1*a* is, for example, greater than that to the first intersection line A1, for example, greater than or equal to 20% and less than or equal to 75%.

Figure 5:
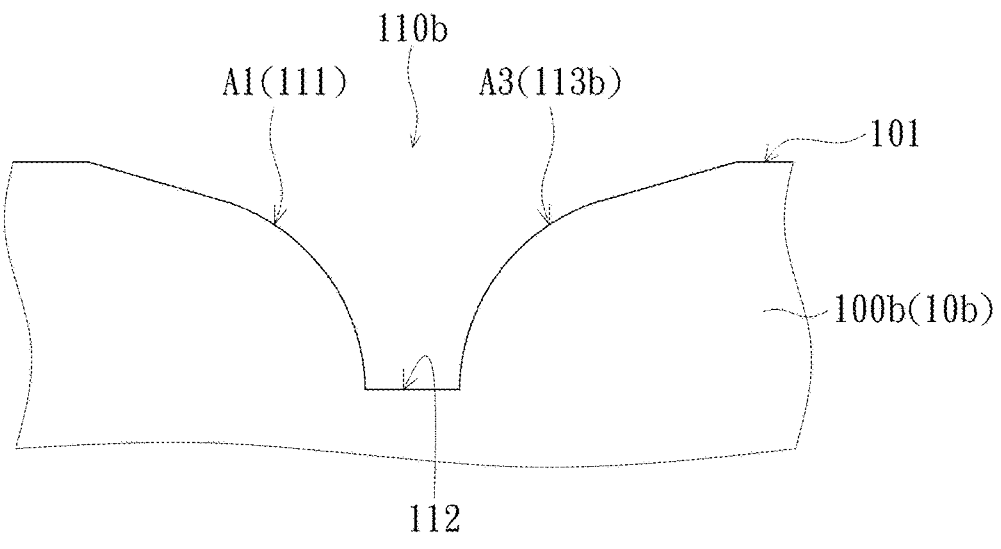
FIG. 5 is a schematic cross-sectional diagram of a single microstructure in a light guide plate according to another embodiment of the disclosure.

FIG. 5 is a schematic cross-sectional diagram of a single microstructure in a light guide plate according to another embodiment of the disclosure. Refer to FIG. 2 and FIG. 5. FIG. 5 is similar to FIG. 2, and the main difference is that the third structural surface 113*b* and the first structural surface 111 in FIG. 5 are, for example, symmetrical. Specifically, there is, for example, a third intersection line A3 in the intersection between the third structural surface 113*b* and the symmetry plane A, and the third intersection line A3 and the first intersection line A1 are, for example, mirror-symmetrical. In other words, the third structural surface 113*b* is also provided with a first-part line segment a1, a second-part line segment a2, and a third-part line segment a3 that are the same as the first-part line segment, the second-part line segment, and the third-part line segment in the first structural surface 111, but the disclosure does not specifically limit this. Because the microstructure 110*b* of the light guide plate 100*b* in this embodiment is provided with the third intersection line A3 and the first intersection line A1 that are mirror-symmetrical, the microstructure 110*b* can be used in a surface light source module 10*b* with light incident bidirectionally.

Figure 6:
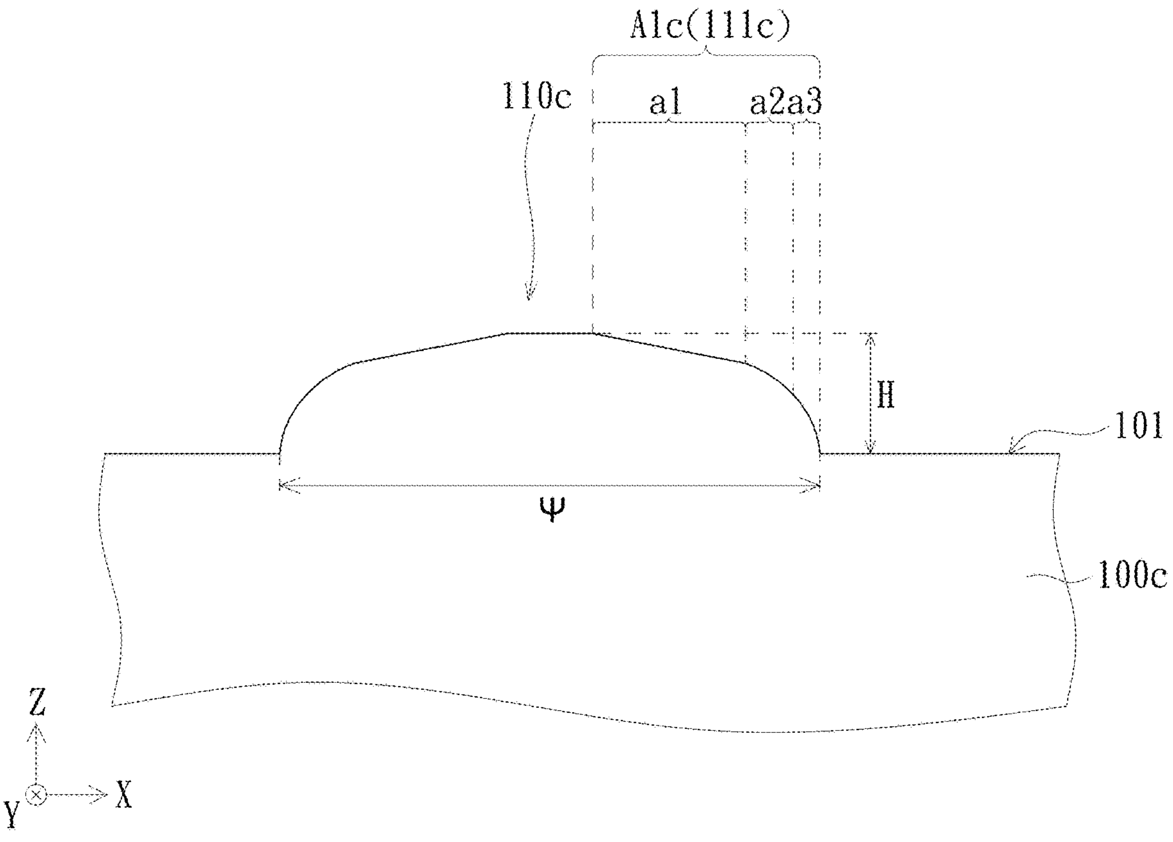
FIG. 6 is a schematic cross-sectional diagram of a single microstructure in a light guide plate according to another embodiment of the disclosure.

FIG. 6 is a schematic cross-sectional diagram of a single microstructure in a light guide plate according to another embodiment of the disclosure. Refer to FIG. 6. Each microstructure 110*c* in this embodiment, for example, protrudes from the first surface 101, the first-part line segment a1 is, for example, away from the first surface 101, and the third-part line segment a3 is, for example, connected to the first surface 101. Specifically, the first intersection line A1*c* is the same as the first intersection line A1, and no redundant detail is to be given herein. In addition, the surface of each microstructure 110*c* connected to the first surface 101 has, for example, the maximum width y along the direction X perpendicular to the light incident surface 103, each microstructure 110*c* has, for example, the maximum height H in the direction Z perpendicular to the first surface 101, and the maximum height H is, for example, less than or equal to three-tenths of the maximum width Ψ. When the microstructure 110*c*, for example, protrudes from the first surface 101, the flat microstructure 110*c* (that is, the ratio of the maximum height H to the maximum width w is small) facilitates the transmission of light (as shown in FIG. 1) to the first structural surface 111*c*.

Figure 7:
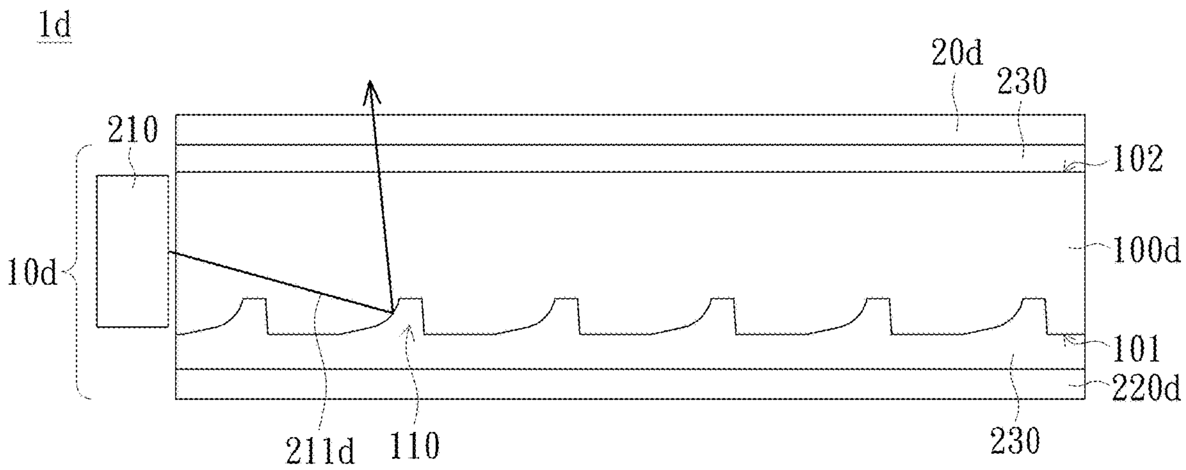
FIG. 7 is a schematic cross-sectional diagram of a display device according to another embodiment of the disclosure.

FIG. 7 is a schematic cross-sectional diagram of a display device according to another embodiment of the disclosure. Refer to FIG. 1 and FIG. 7. The surface light source module 10*d* in this embodiment is similar to the surface light source module 10. The main difference is that the second surface 102 of the surface light source module 10*d* is, for example, the light-emitting surface of the surface light source module 10*d*, and the covering layer 220*d* is, for example, a reflective sheet. In this case, the surface light source module 10*d* is, for example, a backlight module. Because the light guide plate 100*d* is also provided with the microstructure 110 as shown in FIG. 1, it also helps to correct the transmission direction of some of the light (such as light 211*d*) of the light source component 210, so that the surface light source module 10*d* can provide light beams that are emitted evenly in a forward direction and that are transmitted toward a display element 20*d*. In addition, the display element 20*d* in this embodiment is, for example, a transmissive liquid crystal panel. In addition, the surface light source module 10*d* may further include an optical film (not shown) disposed between the light guide plate 100*d* and the display element 20*d*. The light guide plate 100*d* and the optical film may be fully adhered or there may be an air gap.

Figure 8:
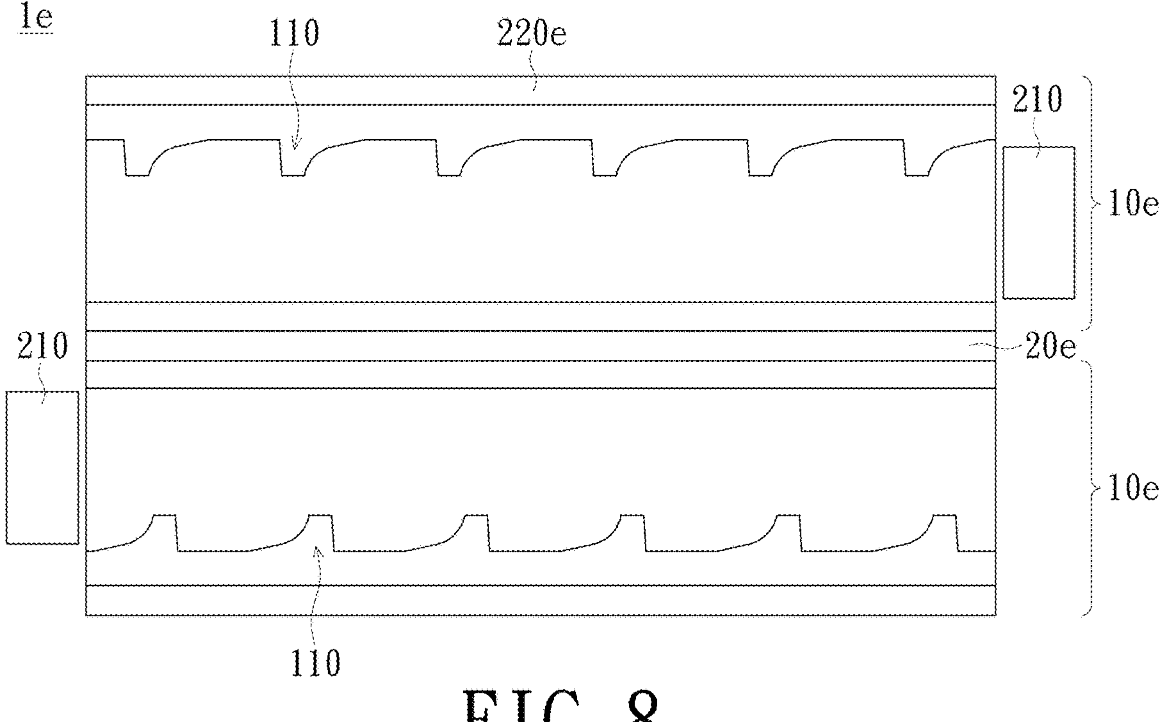
FIG. 8 is a schematic cross-sectional diagram of a dual-sided transparent display device according to an embodiment of the disclosure.

FIG. 8 is a schematic cross-sectional diagram of a dual-sided transparent display device according to an embodiment of the disclosure. Refer to FIG. 1 and FIG. 8. The dual-sided transparent display device 1*e* in an embodiment of the disclosure includes a transparent display panel 20*e* and two surface light source modules 10*e*. The transparent display panel 20*e* is disposed between the two surface light source modules 10*e*. The surface light source module 10*e* in this embodiment is similar to the surface light source module 10 in FIG. 1. The main difference is that the covering layer 220*e* of the surface light source module 10*e* is, for example, a transparent base substrate, and the transparent display panel 20*e* is equivalent to the display element 20 in FIG. 1, but the transparent display panel 20*e* can display the two surface light source modules 10*e* respectively. The remaining details are similar to those in the surface light source modules 10, and no redundant detail is to be given herein. The microstructures 110 of the surface light source module 10*e* in this embodiment are the same as the microstructures 110 of the surface light source module 10, but the disclosure is not limited thereto. In another embodiment, the microstructure 110 of the surface light source module 10*e* may be a microstructure 110*a*, a microstructure 110*b*, or a microstructure 110*c*. In addition, the microstructures 110 of the two surface light source modules 10*e* in this embodiment are, for example, the same, but the disclosure does not specifically limit this. In another embodiment, the microstructures 110 of the two surface light source modules 10*e* may be different. It should be noted that light source components 210 of the two surface light source modules 10*e* in this embodiment are disposed, for example, opposite to each other. However, the disclosure does not specifically limit this. In another embodiment, the light source components 210 of the two surface light source modules 10*e* may be disposed on the same side, such as the left side or the right side in FIG. 8.

To sum up, because the microstructures of the surface light source module and the light guide plate of the dual-sided transparent display device in the embodiments of the invention both have small-angle part line segments and large-angle part line segments, the disclosure has at least one of the following advantages: light is emitted evenly and well in a forward direction; and when the surface light source module is used in the display device (such as the dual-sided transparent display device of the disclosure or another one-sided display device), the visibility of the display device under strong ambient light is improved.

The foregoing description of the preferred embodiment of the disclosure has been presented for purposes of illustration and description. It is not intended to be exhaustive or to limit the disclosure to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the disclosure and its best mode practical application, thereby to enable persons skilled in the art to understand the disclosure for various embodiments and with various modifications as are suited to the particular use or implementation contemplated. It is intended that the scope of the disclosure be defined by the claims appended hereto and their equivalents in which all terms are meant in their broadest reasonable sense unless otherwise indicated. Therefore, the term "the disclosure" is not necessary limited the claim scope to a specific embodiment, and the reference to particularly preferred exemplary embodiments of the disclosure does not imply a limitation on the disclosure, and no such limitation is to be inferred. The disclosure is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the disclosure. It should be appreciated that variations may be made in the embodiments described by persons skilled in the art without departing from the scope of the disclosure as defined by the following claims. Moreover, no element and component in the disclosure is intended to be dedicated to the public regardless of whether the element or component is explicitly recited in the following claims.

What is claimed is:

1. A surface light source module, comprising:

a light guide plate, having a first surface, a second surface, and a light incident surface, wherein the first surface is opposite to the second surface, the light incident surface is connected to the first surface and the second surface, and the first surface is provided with a plurality of microstructures;

a light source component, disposed opposite to the light incident surface;

a covering layer, disposed opposite to the first surface; and an optical adhesive layer, disposed between the light guide plate and the covering layer and covering the microstructures, wherein each of the microstructures has a first structural surface connected to the first surface, each of the microstructures has a symmetry plane, the symmetry plane is perpendicular to the first surface, an included angle between the symmetry plane and the light incident surface is from 45 degrees to 90 degrees, an intersection between the first structural surface and the symmetry plane has a first intersection line, the first intersection line comprises a first-part line segment, a second-part line segment, and a third-part line segment, the first-part line segment or the third-part line segment is connected to the first surface, the second-part line segment is connected between the first-part line segment and the third-part line segment, the optical adhesive layer at least contacts the second-part line segment of the first intersection line of the first structural surface, there is a first included angle between a tangent line at each position on the first-part line segment and the first surface, there is a third included angle between a tangent line at each position on the third-part line segment and the first surface, the first included angle is greater than 0 degrees and less than or equal to 30 degrees, the third included angle is greater than or equal to 50 degrees and less than or equal to 90 degrees, and the second-part line segment is a curve; and a ratio of a first length of the first-part line segment to a total length of the first intersection line is greater than or equal to 5%, and a ratio of a third length of the third-part line segment to the total length of the first intersection line is greater than or equal to 5%.

2. The surface light source module according to claim 1, wherein the ratio of the third length of the third-part line segment to the total length of the first intersection line is greater than or equal to 20%, and a ratio of the third-part line segment corresponding to the third included angle greater than 65 degrees to the total length of the first intersection line is greater than or equal to 15%.

3. The surface light source module according to claim 1, wherein each of the microstructures is recessed from the first surface, wherein as each position on the first-part line segment is farther away from the light incident surface, an angle of the first included angle is increasingly greater or remains unchanged, wherein there is a second included angle between a tangent line of each position on the second-part line segment and the first surface, wherein as each position on the second-part line segment is farther away from the light incident surface, an angle of the second included angle is increasingly greater, wherein as each position on the third-part line segment is farther away from the light incident surface, an angle of the third included angle is increasingly greater or remains unchanged, wherein a maximum value of the first included angle is less than or equal to a minimum value of the second included angle, and a maximum value of the second included angle is less than or equal to a minimum value of the third included angle.

4. The surface light source module according to claim 1, wherein the first-part line segment is a curve, a straight line, or a combination of a curve and a straight line, and the third-part line segment is a curve, a straight line, or a combination of a curve and a straight line.

5. The surface light source module according to claim 1, wherein each of the microstructures is recessed from the first surface, each of the microstructures further has a second structural surface and a third structural surface, the second structural surface is connected between the first structural surface and the third structural surface, the third structural surface is connected to the first surface, and the third-part line segment is connected to the second structural surface; and there is a fourth included angle between the third structural surface and the first surface, and the fourth included angle is greater than or equal to 50 degrees and less than or equal to 90 degrees.

6. The surface light source module according to claim 5, wherein the second structural surface has a width along a direction perpendicular to the light incident surface, each of the microstructures has a maximum depth, and the width is greater than or equal to one-tenth of the maximum depth.

7. The surface light source module according to claim 1, wherein each of the microstructures is recessed from the first surface, each of the microstructures further has a second structural surface and a third structural surface, the second structural surface is connected between the first structural surface and the third structural surface, the third structural surface is connected to the first surface, and the third-part line segment is connected to the second structural surface; and there is a third intersection line in an intersection between the third structural surface and the symmetry plane, the third intersection line is mirror-symmetrical to the first intersection line, the second structural surface has a width along a direction perpendicular to the light incident surface, each of the microstructures has a maximum depth, and the width is greater than or equal to one-tenth of the maximum depth.

8. The surface light source module according to claim 1, wherein each of the microstructures protrudes from the first surface, the first-part line segment is away from the first surface, and the third-part line segment is connected to the first surface.

9. The surface light source module according to claim 8, a surface of each of the microstructures connected to the first surface has a maximum width along a direction perpendicular to the light incident surface, each of the microstructures has a maximum height, and the maximum height is less than or equal to three-tenths of the maximum width.

10. The surface light source module according to claim 1, wherein the covering layer is glass or a touch panel.

11. The surface light source module according to claim 1, wherein the second surface is a light-emitting surface of the surface light source module, and the covering layer is a reflective sheet.

12. The surface light source module according to claim 1, wherein a difference value between a maximum value of the third included angle and a minimum value of the first included angle is greater than or equal to 30 degrees.

13. A surface light source module, comprising:

a light guide plate, having a first surface, a second surface, and a light incident surface, wherein the first surface is opposite to the second surface, the light incident surface is connected to the first surface and the second surface, and the first surface is provided with multiple microstructures;

a light source component, disposed opposite to the light incident surface;

a covering layer, disposed opposite to the first surface; and an optical adhesive layer, disposed between the light guide plate and the covering layer and covering the microstructures, wherein each of the microstructures has a first structural surface connected to the first surface, each of the microstructures has a symmetry plane, the symmetry plane is perpendicular to the first surface, an included angle between the symmetry plane and the light incident surface is from 45 degrees to 90 degrees, an intersection between the first structural surface and the symmetry plane has a first intersection line, the first intersection line comprises a first-part line segment, a second-part line segment, and a third-part line segment, the first-part line segment or the third-part line segment is connected to the first surface, the second-part line segment is connected between the first-part line segment and the third-part line segment, the optical adhesive layer at least contacts the second-part line segment of the first intersection line of the first structural surface, there is a first included angle between a tangent line at each position on the first-part line segment and the first surface, there is a second included angle between a tangent line at each position on the second-part line segment and the first surface, there is a third included angle between a tangent line at each position on the third-part line segment and the first surface, the first included angle has a maximum value of the first included angle, the third included angle has a minimum value of the third included angle, the maximum value of the first included angle is greater than 0 degrees and less than or equal to 40 degrees, the minimum value of the third included angle is greater than or equal to 50 degrees and less than or equal to 90 degrees, and a ratio of a first length of the first-part line segment to a total length of the first intersection line is greater than or equal to 5%, a ratio of a third length of the third-part line segment to the total length of the first intersection line is greater than or equal to 5%, and the second included angle is gradually increased from the maximum value of the first included angle to the minimum value of the third included angle.

14. A dual-sided transparent display device, comprising:

a transparent display panel; and two surface light source modules, wherein the transparent display panel is disposed between the two surface light source modules, and each of the two surface light source modules comprises:

a light guide plate, having a first surface, a second surface, and a light incident surface, wherein the first surface is opposite to the second surface, the light incident surface is connected to the first surface and the second surface, the second surface is adjacent to the transparent display panel, and the first surface is a light-emitting surface and is provided with multiple microstructures;

a light source component, disposed opposite to the light incident surface;

a covering layer, disposed opposite to the first surface; and an optical adhesive layer, disposed between the light guide plate and the covering layer and covering the microstructures, wherein each of the microstructures has a first structural surface connected to the first surface, each of the microstructures has a symmetry plane, the symmetry plane is perpendicular to the first surface, an included angle between the symmetry plane and the light incident surface is from 45 degrees to 90 degrees, an intersection between the first structural surface and the symmetry plane has a first intersection line, the first intersection line comprises a first-part line segment, a second-part line segment, and a third-part line segment, the first-part line segment or the third-part line segment is connected to the first surface, the second-part line segment is connected between the first-part line segment and the third-part line segment, the optical adhesive layer at least contacts the second-part line segment of the first intersection line of the first structural surface, there is a first included angle between a tangent line at each position on the first-part line segment and the first surface, there is a third included angle between a tangent line at each position on the third-part line segment and the first surface, the first included angle is greater than 0 degrees and less than or equal to 30 degrees, the third included angle is greater than or equal to 50 degrees and less than or equal to 90 degrees, and the second-part line segment is a curve; and a ratio of a first length of the first-part line segment to a total length of the first intersection line is greater than or equal to 5%, and a ratio of a third length of the third-part line segment to the total length of the first intersection line is greater than or equal to 5%.

15. The dual-sided transparent display device according to claim 14, wherein the covering layer is a transparent substrate.

* * * * *